(12) United States Patent
Ben Josef et al.

(10) Patent No.: US 9,618,339 B2
(45) Date of Patent: Apr. 11, 2017

(54) SPIRIT LEVEL

(71) Applicant: KAPRO INDUSTRIES LTD., Bikat Beit Hakerem (IL)

(72) Inventors: Rafi Ben Josef, Bikat Beit Hakerem (IL); Yossi Palatshe, Tiberias (IL)

(73) Assignee: Kapro Industries Ltd., Bikat Beit Hakeram (IL)

( * ) Notice: Subject to any disclaimer, the term of this patent is extended or adjusted under 35 U.S.C. 154(b) by 146 days.

(21) Appl. No.: 14/442,668

(22) PCT Filed: Jan. 15, 2014

(86) PCT No.: PCT/IL2014/050051
§ 371 (c)(1),
(2) Date: May 13, 2015

(87) PCT Pub. No.: WO2014/132247
PCT Pub. Date: Sep. 4, 2014

(65) Prior Publication Data
US 2016/0258751 A1    Sep. 8, 2016

(30) Foreign Application Priority Data
Feb. 26, 2013   (IL) .......................................... 224928

(51) Int. Cl.
*G01C 9/32* (2006.01)
(52) U.S. Cl.
CPC ...................................... *G01C 9/32* (2013.01)
(58) Field of Classification Search
CPC ....................................................... G01C 9/32

USPC ................................ 33/348, 348.2, 376, 379
See application file for complete search history.

(56) References Cited

U.S. PATENT DOCUMENTS

| 212,823 | A | 3/1879 | Stucky |
| 320,360 | A | 6/1885 | Hutchins |
| 503,065 | A | 8/1893 | Taylor |
| 585,653 | A | 7/1897 | Clowe |
| 692,097 | A | 1/1902 | Wood |
| 771,803 | A | 10/1904 | Bishop |
| 999,573 | A | 8/1911 | Lidholm |

(Continued)

FOREIGN PATENT DOCUMENTS

| AU | 111171 S | 2/1939 |
| CH | 189440 A | 5/1937 |

(Continued)

OTHER PUBLICATIONS

Kapro Industries LTD Box Section Levels Products Page, Kapro Industries Ltd., available at http://www.kapro.com/SubCat.asp?parent=2&cat_id=6, on Aug. 16, 2010, 1 page.

(Continued)

*Primary Examiner* — G. Bradley Bennett
(74) *Attorney, Agent, or Firm* — Novick, Kim & Lee, PLLC; Harold L. Novick

(57) ABSTRACT

Wider overall angular viewing range for a spirit level achieved by provisioning spirit levels with a bubble vial module including a reflective surface wherein the reflective surface is manually pivotal about a pivot axis relative to a non-pivoted direct opposite viewing position such that a user can pivot the reflective surface towards himself. The system may include predetermined viewing positions.

2 Claims, 8 Drawing Sheets

(56) References Cited

U.S. PATENT DOCUMENTS

| | | |
|---|---|---|
| 1,034,049 A | 7/1912 | Wild |
| 1,062,964 A | 5/1913 | Gesbeck et al. |
| 1,777,429 A | 10/1930 | Charlton |
| 2,133,598 A | 10/1938 | Torbert, Jr. |
| 2,362,872 A | 11/1944 | Weagle |
| 2,373,249 A | 4/1945 | Lurcott, Jr. |
| 2,427,256 A | 9/1947 | Butscher |
| 2,453,091 A | 11/1948 | Holloway et al. |
| 2,466,829 A | 4/1949 | Sprinkel |
| 2,669,029 A | 2/1954 | Ries |
| 2,727,314 A * | 12/1955 | Dossie ............... G01C 9/24 33/348 |
| 2,750,677 A * | 6/1956 | Wirth ............... G01C 9/32 33/333 |
| 2,791,036 A | 5/1957 | Gericke |
| 2,857,678 A | 10/1958 | Armour, Jr. |
| 3,064,535 A | 11/1962 | Anderson |
| 3,088,216 A * | 5/1963 | Jesonis ............... G01C 9/24 33/348 |
| 3,368,287 A | 2/1968 | Ault |
| 3,603,000 A | 9/1971 | Ostrager |
| 3,618,222 A * | 11/1971 | Ostrager ............... G01C 9/34 33/348 |
| 3,694,090 A | 9/1972 | Ohyama |
| 3,738,015 A | 6/1973 | De Jong |
| 3,889,353 A | 6/1975 | Provi |
| 3,921,306 A | 11/1975 | Provi |
| 4,103,430 A | 8/1978 | Schrader |
| 4,124,940 A | 11/1978 | Vaida |
| 4,192,383 A | 3/1980 | Kirkland et al. |
| 4,332,046 A | 6/1982 | Foley et al. |
| 4,534,117 A | 8/1985 | Haefner et al. |
| 4,647,767 A | 3/1987 | Jubinski |
| 4,653,193 A | 3/1987 | Kennedy et al. |
| 4,660,292 A | 4/1987 | Richardson |
| 4,860,459 A | 8/1989 | Dengler |
| 5,020,232 A | 6/1991 | Whiteford |
| D320,360 S | 10/1991 | Kennedy |
| 5,075,978 A | 12/1991 | Crowe |
| 5,101,570 A | 4/1992 | Shimura |
| 5,103,569 A | 4/1992 | Leatherwood |
| 5,207,004 A | 5/1993 | Gruetzmacher |
| 5,272,816 A | 12/1993 | Fujiwara |
| 5,317,810 A * | 6/1994 | Isono ............... G01C 9/36 33/366.16 |
| D348,619 S | 7/1994 | Hansen |
| 5,361,503 A | 11/1994 | Anderson |
| 5,406,714 A | 4/1995 | Baker et al. |
| 5,414,937 A | 5/1995 | Denley |
| D360,371 S | 7/1995 | O'Hare et al. |
| D364,104 S | 11/1995 | Johnson |
| 5,467,532 A | 11/1995 | Ames |
| D365,768 S | 1/1996 | Rodriguez |
| 5,588,217 A | 12/1996 | Lindner et al. |
| 5,746,004 A | 5/1998 | Wertheim |
| 5,755,037 A | 5/1998 | Stevens |
| 5,761,818 A * | 6/1998 | Hopkins ............... G01C 9/34 33/348.2 |
| D459,251 S | 6/2002 | Scheyer |
| 6,418,634 B1 | 7/2002 | Szumer |
| 6,449,859 B1 | 9/2002 | Zugel et al. |
| D468,221 S | 1/2003 | Greaves et al. |
| D479,139 S | 9/2003 | Kallabis et al. |
| 6,681,494 B1 | 1/2004 | Bowden |
| D486,084 S | 2/2004 | Kun, Sr. et al. |
| 6,748,666 B2 | 6/2004 | Zugel et al. |
| D497,316 S | 10/2004 | Kun, Sr. et al. |
| D498,152 S | 11/2004 | Hickey |
| D503,635 S | 4/2005 | Kallabis |
| D503,636 S | 4/2005 | Kim |
| 6,957,494 B1 | 10/2005 | Foran |
| 6,968,626 B1 | 11/2005 | Wondracek |
| D513,391 S | 1/2006 | Kim |
| D518,745 S | 4/2006 | Kim |
| D518,746 S | 4/2006 | Kim |
| D521,399 S | 5/2006 | Johnson et al. |
| D526,224 S | 8/2006 | Kim |
| 7,228,637 B2 | 6/2007 | Kim |
| D546,214 S | 7/2007 | Schwartz et al. |
| 7,263,778 B2 | 9/2007 | Lang et al. |
| D555,523 S | 11/2007 | Nickel et al. |
| D560,521 S | 1/2008 | Katz |
| D563,808 S | 3/2008 | Schwartz et al. |
| D573,908 S | 7/2008 | Levinson |
| 7,472,487 B2 | 1/2009 | Tran et al. |
| D596,056 S | 7/2009 | Scheyer |
| D597,872 S | 8/2009 | Gofer |
| D598,308 S | 8/2009 | Gofer |
| D598,309 S | 8/2009 | Gofer |
| 7,568,292 B2 * | 8/2009 | Maruyama ............... G01C 9/28 33/379 |
| D607,351 S | 1/2010 | Gofer |
| 7,779,545 B2 | 8/2010 | Kallabis |
| D625,631 S | 10/2010 | Ben-Josef et al. |
| D644,944 S | 9/2011 | Kallabis et al. |
| 8,220,171 B2 | 7/2012 | Ben Josef et al. |
| D668,163 S | 10/2012 | Levinson |
| 2004/0177524 A1 * | 9/2004 | Tan ............... G01C 9/34 33/348 |
| 2005/0039341 A1 | 2/2005 | Hickey |
| 2005/0229413 A1 | 10/2005 | Foran |
| 2006/0037204 A1 | 2/2006 | Gruetzmacher |
| 2007/0246116 A1 | 10/2007 | Peak et al. |
| 2009/0139102 A1 | 6/2009 | Kallabis |
| 2011/0271537 A1 | 11/2011 | Scheyer et al. |
| 2013/0340270 A1 * | 12/2013 | Silberberg ............... G01C 9/28 33/379 |

FOREIGN PATENT DOCUMENTS

| | | |
|---|---|---|
| CN | 2938031 Y | 8/2007 |
| DE | 3125510 | 1/1983 |
| EP | 0239030 A1 | 9/1987 |
| GB | 212823 A | 3/1924 |
| GB | 503065 A | 3/1939 |
| GB | 836728 | 6/1960 |
| GB | 936517 | 9/1963 |
| GB | 2080529 A | 2/1982 |
| GB | 2162947 A | 2/1986 |
| GB | 2222677 | 3/1990 |
| GB | 2223586 A | 4/1990 |
| JP | 8-101037 | 4/1996 |
| WO | 96/03258 | 2/1996 |
| WO | 2004/044524 | 5/2004 |
| WO | 2006/023701 | 3/2006 |
| WO | 2007/013057 A2 | 2/2007 |
| WO | 2007/072489 | 6/2007 |
| WO | 2008/107868 | 9/2008 |

OTHER PUBLICATIONS

Kapro Industries LTD I-Beam Levels Products Page, Kapro Industries Ltd., available at http://www.kapro.com/SubCat.asp?parent=2&cat_id=8, on Aug. 16, 2010, 1 page.

PCT Search Report for PCT/IL2014/050051 mailed on Jun. 5, 2014.

* cited by examiner

SPIRIT LEVEL

FIELD OF THE INVENTION

This present invention relates to spirit levels in general and to spirit levels for setting a vertical surface in particular.

BACKGROUND OF THE INVENTION

U.S. Pat. No. 2,791,036 to Gericke entitled Liquid Level discloses a spirit level 10 having a leveling surface 11 for placing on a surface to be leveled, a top surface opposite the leveling surface, and a pair of opposite major surfaces extending between the leveling surface and the top surface. The spirit level 10 is provided with a liquid level tube 21 having right angularly extending portions 22 and 23 is formed with level indicating lines 24 and filled with a liquid 25 (see US '036 Col. 2, lines 13-15). Air forming a bubble 27 is trapped in the tube 21 and is adapted to cooperate with the indicator lines 24 in either arm 22 or 23 depending on the position of the level 10 (see US '036 Col. 2, lines 17-20). The spirit level 10 is provided with a retainer plate 38 which is highly polished and serves as a mirror to reflect an image of the arm 22 of the tube 21 as illustrated in FIG. 1 to permit the horizontal bubble vial therein to be viewed from eye level (see US '036 Col. 2, lines 39-42). A user can view the reflected image of the vial along a so-called direct opposite line of sight directly opposite the spirit level and within a limited so-called direct opposite angular viewing range in the order of ±5° with respect thereto. Any greater movement to the right or left prevents the user viewing the reflected image which limits his ability to work efficiently and comfortably.

Commonly owned U.S. Pat. No. 6,748,666 to Zugel et al. entitled Spirit Level discloses a spirit level 10 having a body 12 with a level face 14 for setting a surface to be leveled, a top surface opposite the leveling surface, and a pair of opposite major surfaces extending between the leveling surface and the top surface. The spirit level 10 includes one or more bubble vials 20 mounted in body 12 for setting a vertical surface and a bubble vial 22 for setting a horizontal surface. The spirit level 10 includes a reflective surface 36 mounted inside a hollow portion of body 12 at an angle to bubble vial 20 and to a viewing plane 32 which reflects the image of bubble vial 20 to the viewing plane. Reflective surface 36 can be a polished mirror or a prism. The spirit level also has a limited direct opposite angular viewing range in the order of ±5° with respect a direct opposite line of sight similar to Gericke.

Commonly owned U.S. Pat. No. 7,117608 to Zugel et al. entitled Spirit

Level which is a continuation of aforementioned U.S. Pat. No. 6,748,666 discloses spirit levels with arrangements for deploying a reflective surface external to a main body for reflecting an image of a vial for setting a vertical surface. However, such arrangements are vulnerable and can only be used from a single side of a spirit level.

There is a need for an improved spirit level so that a user can view a vial for setting a vertical surface over a wider viewing angle compared to the hitherto described spirit levels.

SUMMARY OF THE INVENTION

The present invention is directed towards spirit levels in general and for setting a vertical surface in particular. The spirit levels of the present invention are similar in construction and use as the hitherto described conventional spirit levels insofar as they include an inclined reflective surface for enabling a user standing directly opposite a spirit level to view a reflected image of a bubble vial providing a visual indication of an inclination of a vertical surface to the vertical within a direct opposite angular viewing angle in the order of ±5° with respect a direct opposite line of sight directly opposite the bubble vial.

The spirit levels of the present invention differ from the hitherto described conventional spirit levels insofar as they enable a user standing offset either to the left or the right of a spirit level to still view the reflected image of the bubble vial, thereby enabling a user to use a spirit level work in locations precluding he stand directly opposite a spirit level. Thus, the spirit levels of the present invention afford a wider overall angular viewing range in comparison to the hitherto described conventional spirit levels. This wider overall angular viewing range is achieved by provisioning spirit levels of the present invention with a bubble vial module including a reflective surface wherein the reflective surface is manually pivotal about a pivot axis relative to a non-pivoted direct opposite viewing position such that a user can pivot the reflective surface towards himself.

The reflective surface is preferably pivotal in the order of ±35° with respect to its non-pivoted direct opposite viewing position between an extreme clockwise viewing position and an extreme counterclockwise viewing position such that the spirit level affords an overall angular viewing range in the order of ±40° with respect to a direct opposite line of sight. The reflective surface can be interference fit mounted such that it can be manually pivoted to any angle between its extreme opposite clockwise and counterclockwise positions. Alternatively, the reflective surface can be so-called clicked into one of a predetermined number of viewing positions, for example, a non-pivoted direct opposite viewing position, three clockwise pivoted viewing positions and three counterclockwise pivoted viewing positions. The reflective surface can optionally be a magnifying reflective surface for magnifying the reflected image of a bubble vial.

BRIEF DESCRIPTION OF THE DRAWINGS

In order to understand the invention and to see how it can be carried out in practice, preferred embodiments will now be described, by way of non-limiting examples only, with reference to the accompanying drawings in which similar parts are likewise numbered, and in which.

DETAILED DESCRIPTION OF THE DRAWINGS

Figure 1:
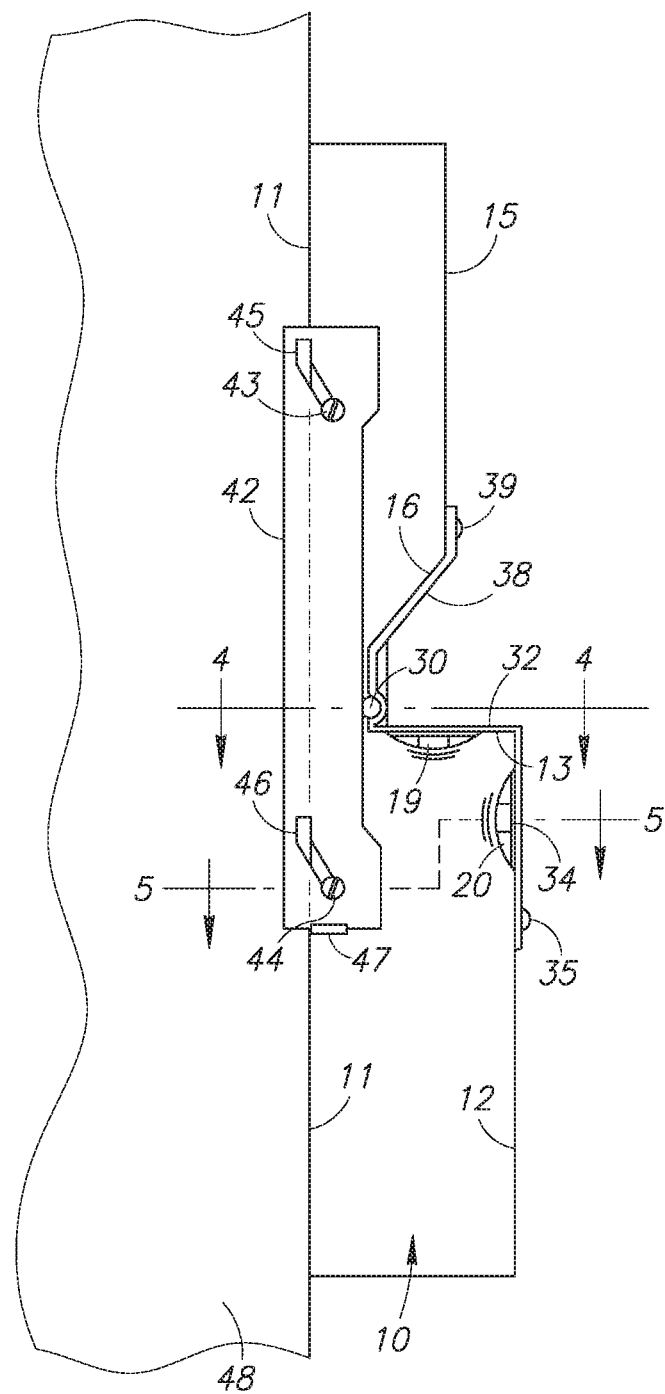
FIG. 1 is a partial vertical cross section of Gericke's liquid level corresponding to U.S. Pat. No. 2,791,036 FIG. 2.

FIG. 1 is a partial vertical cross section of Gericke's liquid level corresponding to U.S. Pat. No. 2,791,036 FIG. 2 as hereinabove discussed in the Background of the Invention.

Figure 2:
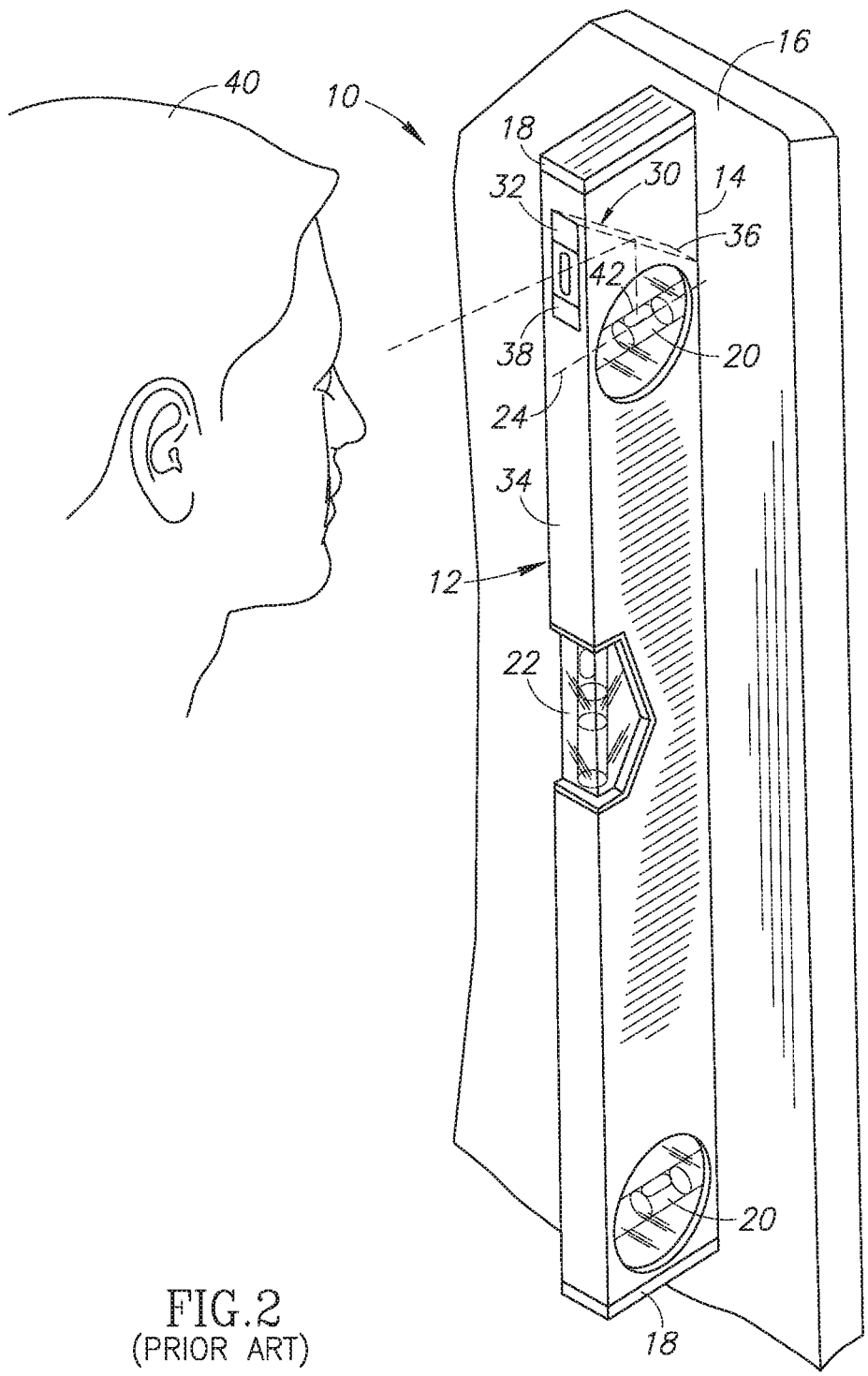
FIG. 2 is a perspective view of Zugel's spirit level corresponding to U.S. Pat. No. 6,748,666 FIG. 1.

FIG. 2 is a perspective view of Zugel's spirit level corresponding to U.S. Pat. No. 6,748,666 FIG. 1 as hereinabove discussed in the Background of the Invention.

FIGS. 3 to 12 show a spirit level 10 including a main body 11 having a longitudinal level axis 12, a leveling surface 13 for setting a vertical surface, a top surface 14 opposite the leveling surface 13, a pair of opposite major surfaces 16 and 17, and a pair of end caps 18 and 19. The main body 11 defines an imaginary longitudinal plane 21 traversing the longitudinal level axis 12 and perpendicular to the leveling surface 13.

The main body 11 is formed with a generally elongated U-shaped cutout 22 in the top surface 14 towards the end cap 18 for forming a first cutout surface 23 parallel to the leveling surface 13, a second cutout surface 24 perpendicular to the leveling surface 13 and towards the end cap 18 and a third curved cutout surface 26 opposite the second cutout surface 24.

The spirit level 10 is provided with a bubble vial 27 having a longitudinal bubble vial axis 28 parallel to the leveling surface 13 for providing a visual indication regarding the inclination of a horizontal surface relative to the horizontal on setting the leveling surface 13 on a horizontal surface.

The spirit level 10 is provided with a bubble vial module 29 mounted in the cutout 22. The bubble vial module 29 includes a housing 31 having a bubble vial 32 having a longitudinal bubble vial axis 33 disposed in the imaginary longitudinal plane 21 for providing a visual indication regarding the inclination of a vertical surface relative to the vertical on setting the leveling surface 13 on a vertical surface.

The housing 31 includes a support 34 for supporting a reflective surface member 36 including a reflective surface 37 inclined towards the bubble vial 32. The support 34 supports the reflective surface member 36 about a pivot axis 38 disposed in the imaginary longitudinal plane 21 and subtending an acute included angle with the longitudinal bubble vial axis 33. The acute included angle is typically in the order of 45°.

Figure 3:
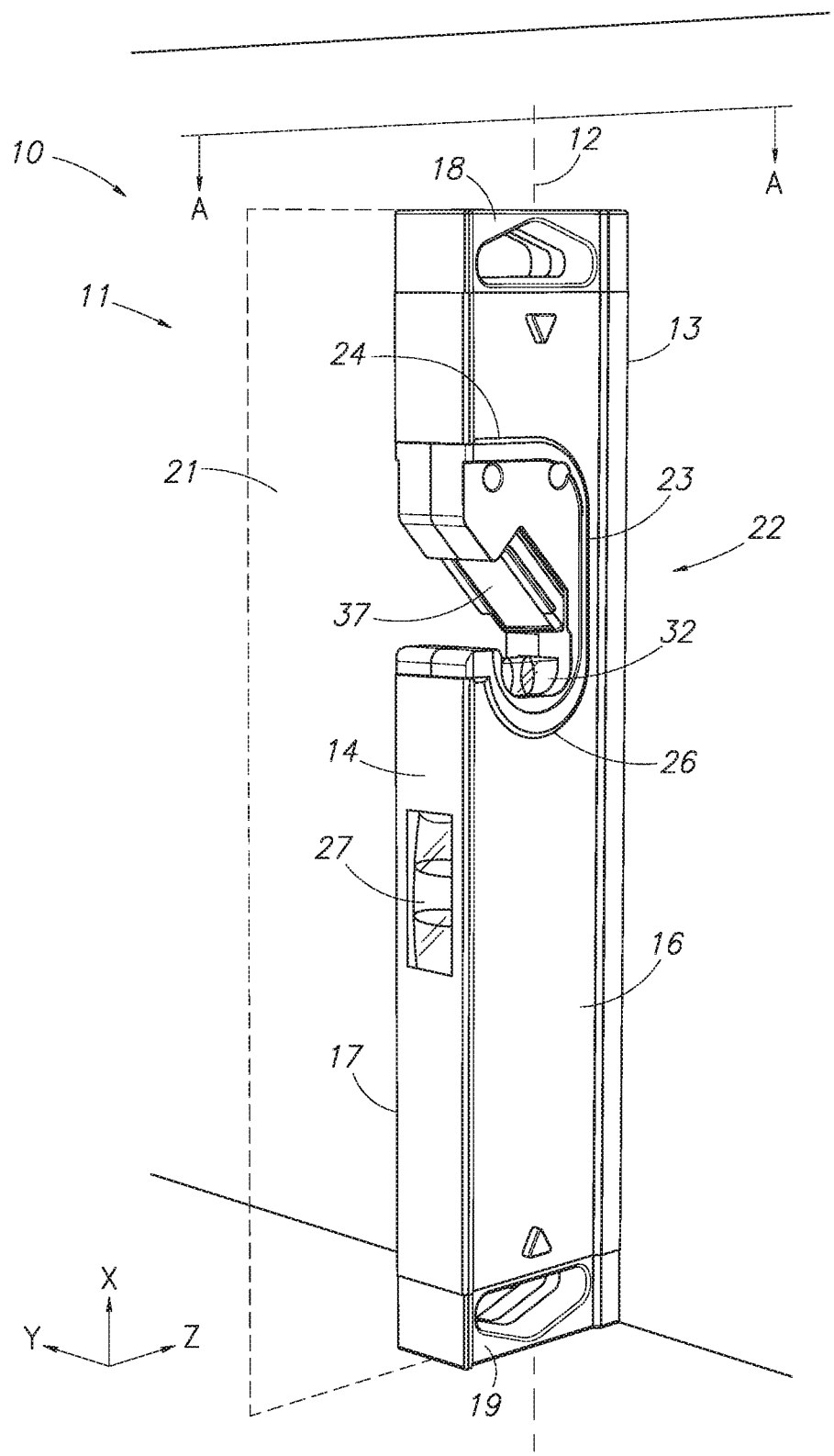
FIG. 3 is a perspective view of a spirit level having a leveling surface and a pivotal bubble vial module with a reflective surface in accordance with a first embodiment of the present invention.
Figure 4:
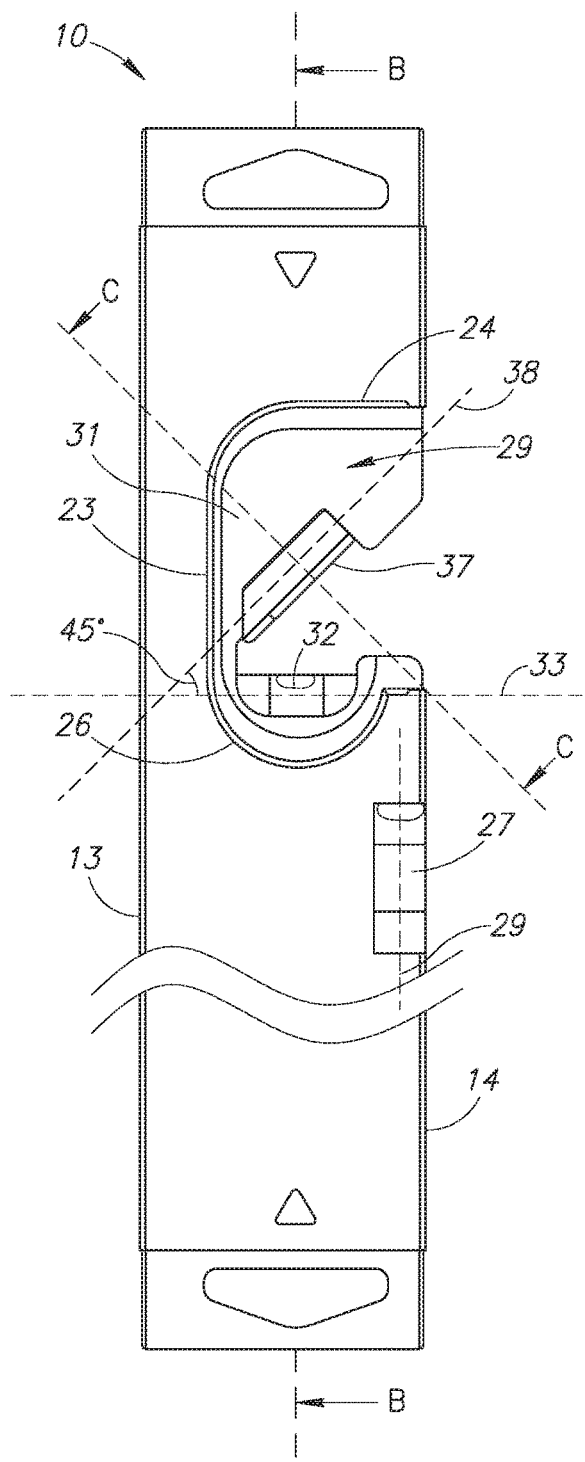
FIG. 4 is a longitudinal cross section of FIG. 3's spirit level along an imaginary longitudinal plane denoted by line A-A perpendicular to the leveling surface.
Figure 5:
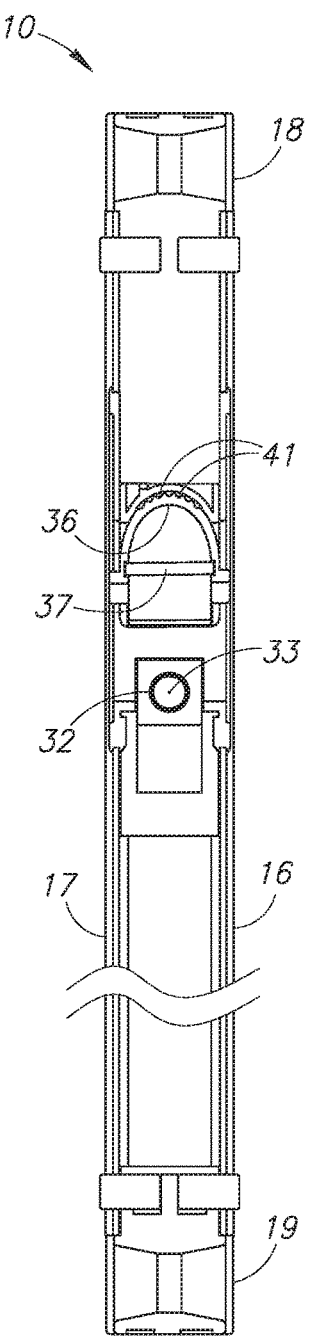
FIG. 5 is a longitudinal cross section of FIG. 3's spirit level along a line B-B parallel to the leveling surface.
Figure 6:
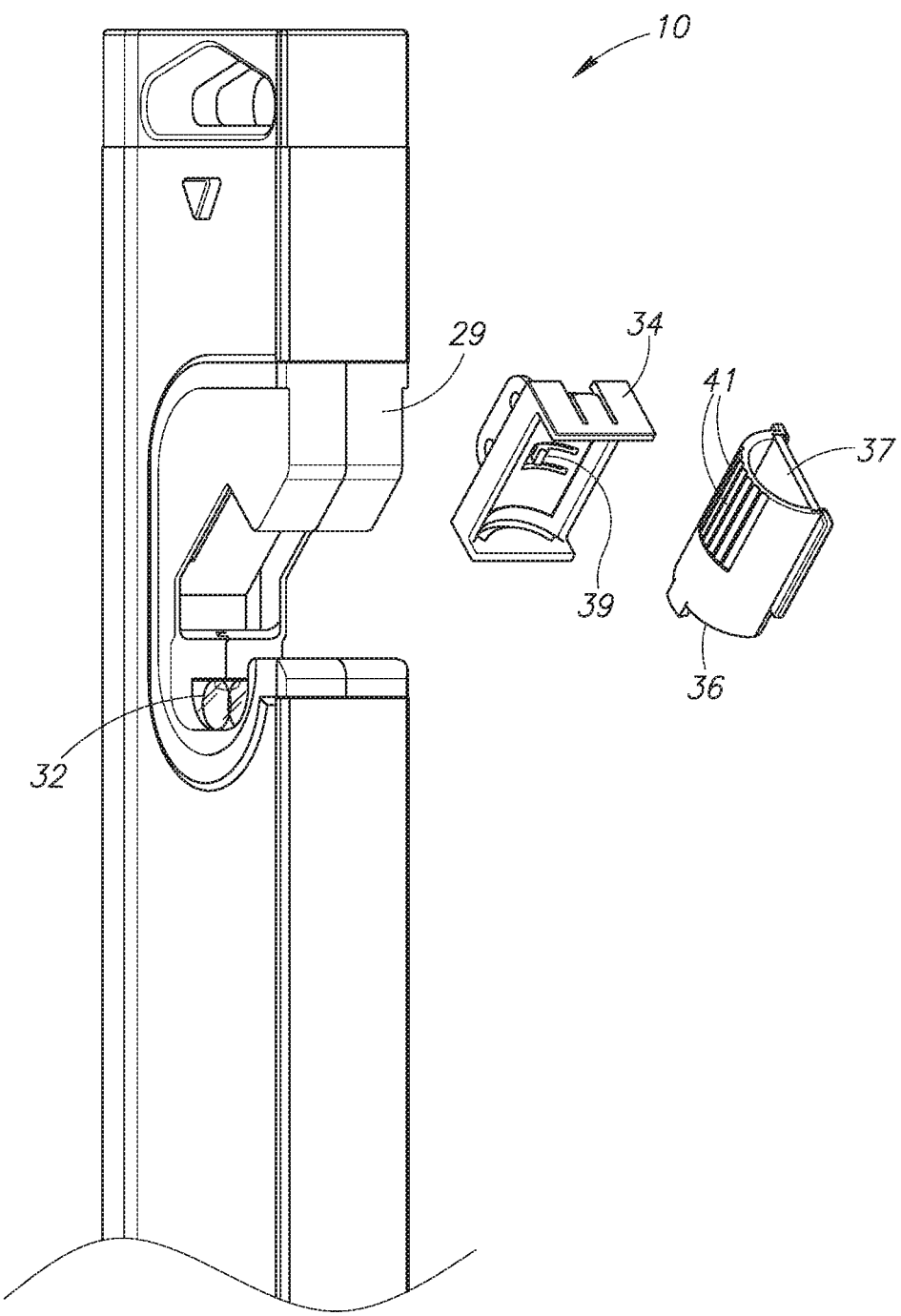
FIG. 6 is an exploded view of the bubble vial module.
Figure 7A:
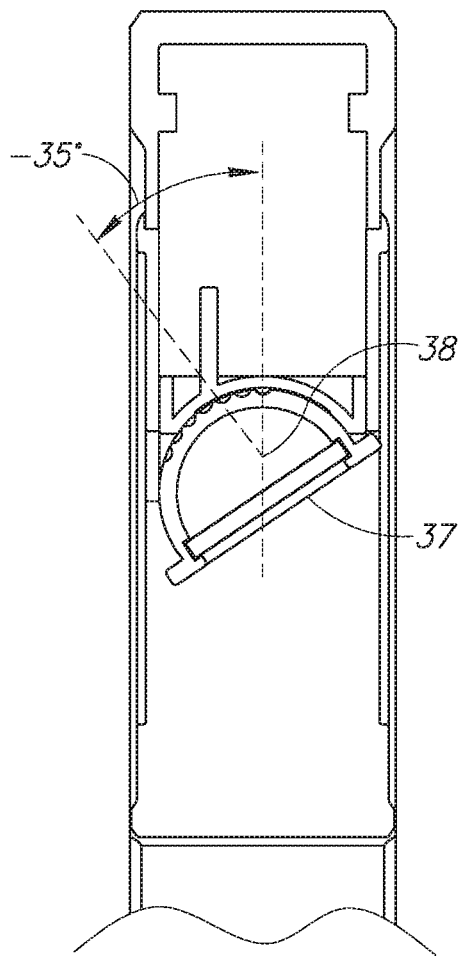
FIG. 7A is a cross section of FIG. 3's spirit level along line C-C in FIG. 4 with its reflective surface in its extreme counterclockwise viewing position.
Figure 7B:
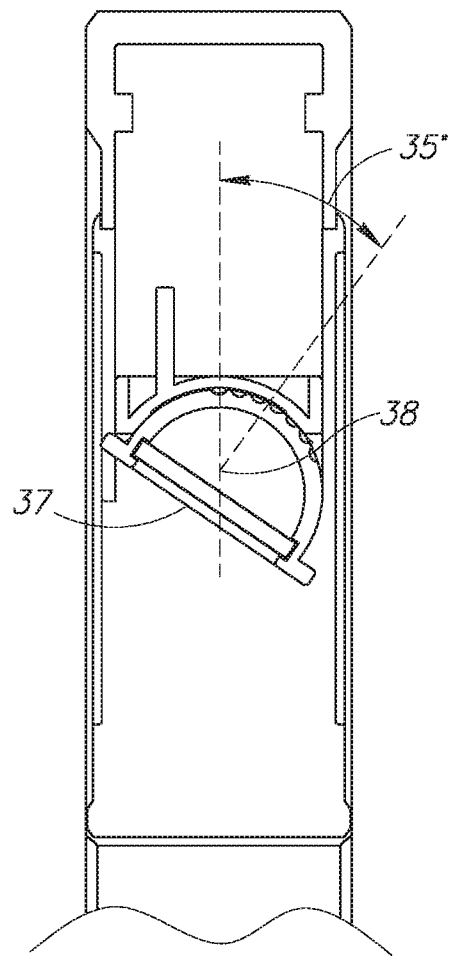
FIG. 7B is a cross section of FIG. 3's spirit level along line C-C in FIG. 4 with its reflective surface in its extreme clockwise viewing position.

FIGS. 3 to 5 show a non-pivoted direct opposite viewing position similar to the hitherto described conventional spirit levels. The reflective surface member 36 is typically pivotal in the order of ±35° with respect to its non-pivoted direct opposite viewing position in a front elevation view of the spirit level 10. FIG. 7A shows an extreme counterclockwise viewing position. FIG. 7B shows an extreme clockwise viewing position.

The support 34 has a spring leaf member 39 for click fitting in longitudinal grooves 41 formed in the rear of the reflective surface member 36 such that the reflective surface member 36 can be manually deployed at any one of a series of, say, seven predetermined viewing positions including the non-pivoted direct opposite viewing position, FIG. 7A's extreme counterclockwise viewing position, and FIG. 7B's extreme clockwise viewing position. The series of predetermined viewing positions includes two additional counterclockwise viewing positions between FIG. 3's non-pivoted viewing position and FIG. 7A's extreme counterclockwise viewing position and two additional clockwise viewing positions between FIG. 3's non-pivoted viewing position and FIG. 7B's extreme clockwise viewing position.

FIGS. 8 to 10 show the use of the spirit level 10 for determining the inclination of an upright surface as benefited.

Figure 8A:
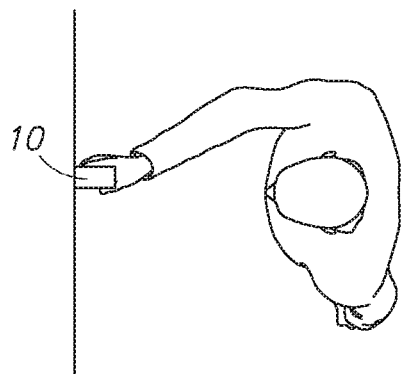
FIG. 8A is a top plan view of a user standing directly opposite FIG. 3's spirit level to determine an inclination of a vertical surface.
Figure 8B:
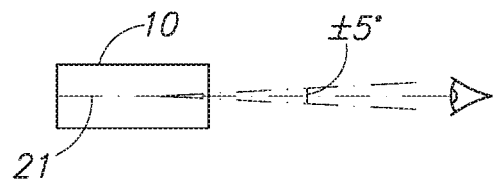
FIG. 8B is a top plan view showing the angular viewing range of the FIG. 8A user.

FIGS. 8A and 8B show the user standing directly opposite the spirit level 10 and holding the spirit level 10 in his right hand. The user typically sets the reflective surface 37 in its non-pivoted viewing position such that the user is able to view a reflected image of the bubble vial 27 along a direct opposite line of sight bound within a direct opposite angular viewing range similar to the hitherto described conventional spirit levels. The direct opposite angular viewing range is typically in the order of ±5° relative to the imaginary longitudinal plane 21.

Figure 9A:
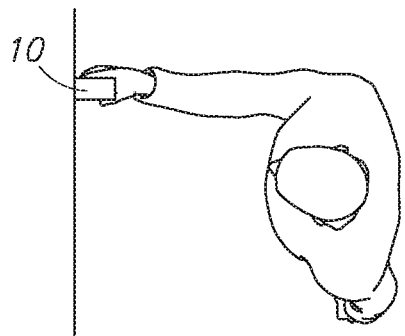
FIG. 9A is a top plan view of a user standing to the left of FIG. 3's spirit level at a −35° line of sight position to determine an inclination of a vertical surface.
Figure 9B:
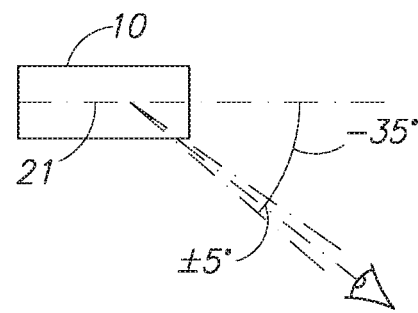
FIG. 9B is a top plan view showing the angular viewing range of the FIG. 9A user.

FIGS. 9A and 9B show the user standing to the left of the spirit level 10 at a −35° line of sight position with respect to the imaginary longitudinal plane 21 and also holding the spirit level 10 in his right hand. FIGS. 9A and 9B show the reflective surface member 37 set to its extreme clockwise viewing position for enabling the user to view a reflected image of the bubble vial 32 from his −35° line of sight position within an ±5° angular viewing range.

Figure 10A:
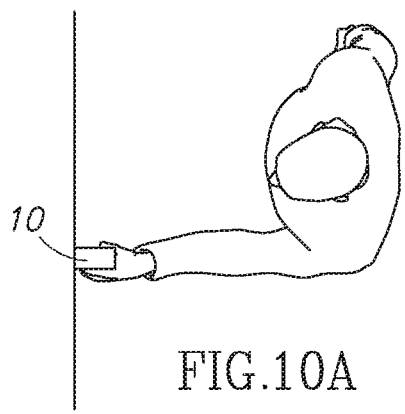
FIG. 10A is a top plan view of a user standing to the right of FIG. 3's spirit level at a 35° line of sight position to determine an inclination of a vertical surface.
Figure 10B:
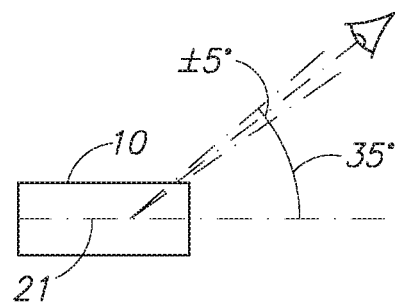
FIG. 10B is a top plan view showing the angular viewing range of the FIG. 10A user.

FIGS. 10A and 10B show the user standing to the right of the spirit level 10 at a 35° line of sight position with respect to the imaginary longitudinal plane 21 and holding the spirit level 10 in his left hand. FIGS. 10A and 10B show the reflective surface member 37 set to its extreme counterclockwise viewing position for enabling the user to view a reflected image of the bubble vial 32 from his 35° line of sight position within an ±5° angular viewing range.

Thus, the spirit level 10 affords an overall angular viewing range relative to the imaginary longitudinal plane 21 in the order of ±40° as opposed to the ±5° direct opposite angular viewing range of the non-pivoted viewing position similar to hitherto described conventional spirit levels.

Figures 11, 12:
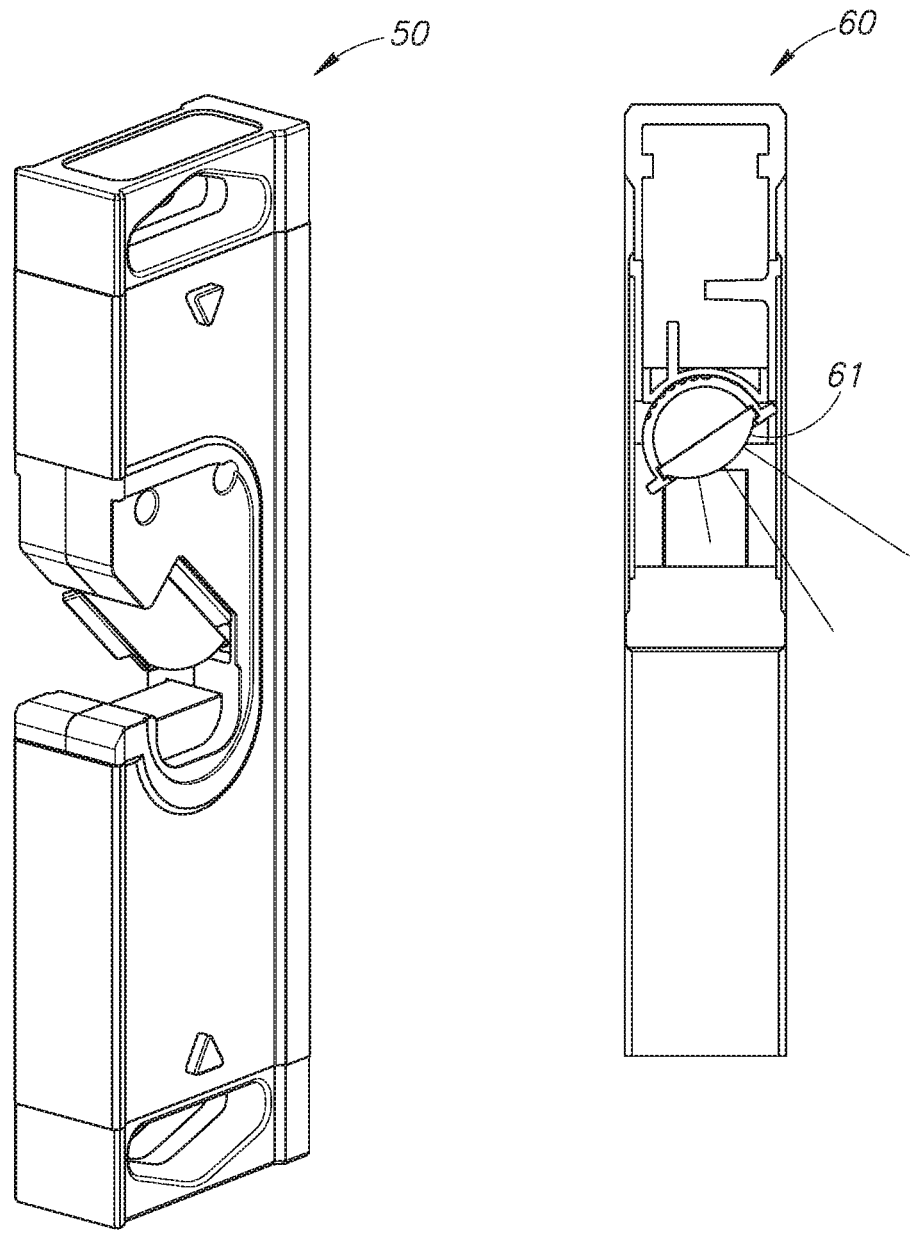
FIG. 11 is a perspective view of a spirit level with a bubble vial module in accordance with a second embodiment of the present invention.
FIG. 12 is a cross section of FIG. 3's spirit level along line C-C in FIG. 4 in accordance with a third embodiment of the present invention.

FIG. 11 shows a spirit level 50 similar to the spirit level 10 except without the former 40 is shorter and does not include the bubble vial 27.

FIG. 12 shows a spirit level 60 similar to the spirit level 10 except with the reflective surface is a magnifying reflective surface 61 for magnifying the reflected image of the bubble vial.

While particular embodiments of the present invention are illustrated and described, it would be obvious to those skilled in the art that various other changes and modifications can be made without departing from the spirit and scope of the invention.

The invention claimed is:

1. A spirit level for setting a vertical surface, the spirit level having a longitudinal level axis and comprising:
   (a) a main body having a leveling surface to be set on the vertical surface and defining an imaginary longitudinal plane traversing the longitudinal level axis and perpendicular to said leveling surface;
   (b) a bubble vial having a longitudinal bubble vial axis disposed in said imaginary longitudinal plane for providing a visual indication of an inclination of the vertical surface with respect to the vertical; and
   (c) a reflective surface inclined with respect to said longitudinal bubble vial axis for enabling a user standing directly opposite the spirit level to view a reflected image of said bubble vial along a direct opposite line of sight bound within a direct opposite angular viewing range with respect to said imaginary longitudinal plane;
   characterized in
   said reflective surface having a pivot axis disposed in said imaginary longitudinal plane and subtending an acute included angle with said longitudinal bubble vial axis whereby said reflective surface is pivotal with respect to a non-pivoted direct opposite viewing position enabling a user standing directly opposite the spirit level to view a reflected image of said bubble vial along said direct opposite line of sight bound within said direct opposite angular viewing range,
   said reflective surface being pivotal between an extreme clockwise viewing position and an extreme counter-clockwise viewing position with respect to said non-pivoted direct opposite viewing position thereby enabling a user standing offset either to the left and the right of the spirit level to pivot said reflective surface toward himself to view a reflected image of said bubble vial such that the spirit level affords an overall angular viewing range greater than said direct opposite angular viewing range.

2. The spirit level according to claim 1 and further comprising a bubble vial module for enabling manual deployment of said reflective surface at a series of predetermined viewing positions about said pivot axis.

* * * * *